United States Patent
Jörn et al.

(10) Patent No.: US 10,377,461 B2
(45) Date of Patent: Aug. 13, 2019

(54) AIRCRAFT STRUCTURAL COMPONENT

(71) Applicant: Airbus Operations GmbH, Hamburg (DE)

(72) Inventors: Paul Jörn, Hamburg (DE); Pierre Zahlen, Hamburg (DE); Markus Müller, Hamburg (DE); Ichwan Zuardy, Hamburg (DE); Claus Hanske, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/747,707

(22) Filed: Jun. 23, 2015

(65) Prior Publication Data

US 2016/0001869 A1    Jan. 7, 2016

(30) Foreign Application Priority Data

Jul. 4, 2014 (DE) .................. 10 2014 109 362

(51) Int. Cl.
*B64C 1/12* (2006.01)
*B64C 1/06* (2006.01)

(52) U.S. Cl.
CPC ................ *B64C 1/12* (2013.01); *B64C 1/064* (2013.01); *B64C 1/068* (2013.01)

(58) Field of Classification Search
CPC .................... B64C 1/12; B64C 1/068; B64C 1/064; B64C 3/26; B64C 3/30; B32B 3/30;
(Continued)

(56) References Cited

U.S. PATENT DOCUMENTS 5,456,198 A * 10/1995 Smedal .................... B63B 5/24
                                                      114/65 R
6,355,337 B1 * 3/2002 Piening .................. B29C 70/48
                                                      428/223
(Continued)

FOREIGN PATENT DOCUMENTS

DE    10 2009 060 695 A1    7/2011
DE    10 2010 035 787 A1    3/2012
FR       2 766 407 A1        1/1999

OTHER PUBLICATIONS

Zahlen, Pierre: "Beitrag zur Kostengünstigen Industriellen Fertigung von Haupttragenden CFK-Grosskomponenten der Kommerziellen Luftfahrt Mittels Kernverbundbauweise in Harzinfusionstechnologie;" ISBN 978-3-8325-3329-8; Logos Verlag Berlin GmbH, 2013 Machine Translation: "Contribution for cost-effective industrial production of main transfer or large CFRP components of commercial aviation means core composite structure in resin infusion technology".
(Continued)

Primary Examiner — Medhat Badawi
Assistant Examiner — Vicente Rodriguez
(74) Attorney, Agent, or Firm — Jenkins, Wilson, Taylor & Hunt, P.A.

(57) ABSTRACT

An aircraft structural component having a skin element, including an inner surface, a multitude of transverse stiffening elements, which lie against the inner surface of the skin element, and a multitude of longitudinal stiffening elements, perpendicular to the transverse stiffening elements against the inner surface of the skin element, wherein between a first and a second transverse stiffening element and also between a first and a second longitudinal stiffening element, a first skin section is defined. An aircraft structural component is provided with the quantity of the longitudinal stiffening elements reduced. A first applied reinforcement includes a core layer having a contour line running along the
(Continued)

circumference of the skin element, the first applied reinforcement including a face sheet surrounding the core layer on the side thereof which faces away from the skin element, which face sheet is connected to the skin element along the core layer contour line.

9 Claims, 4 Drawing Sheets

(58) Field of Classification Search
CPC ............ B32B 2605/18; B32B 2305/08; B29C 43/206; B29C 70/865; B29C 66/131; B29L 2031/3076
See application file for complete search history.

(56) References Cited

U.S. PATENT DOCUMENTS

| | | | |
|---|---|---|---|
| 6,613,258 B1 | 9/2003 | Maison et al. | |
| 8,985,512 B1* | 3/2015 | Chan | B64C 1/061 244/120 |
| 2004/0035979 A1* | 2/2004 | McCoskey, Jr. | B64C 3/26 244/117 R |
| 2006/0145006 A1* | 7/2006 | Drost | B64C 1/066 244/118.5 |
| 2012/0286093 A1* | 11/2012 | Noebel | B64C 1/061 244/119 |
| 2013/0043344 A1* | 2/2013 | Ruonavaara | B64C 1/066 244/118.1 |
| 2013/0306794 A1* | 11/2013 | Zahlen | B64C 1/068 244/118.5 |
| 2015/0298423 A1* | 10/2015 | Holemans | B32B 5/18 244/133 |

OTHER PUBLICATIONS

German Office Action for Application No. 10 2014 109362 dated Feb. 25, 2015.

* cited by examiner

AIRCRAFT STRUCTURAL COMPONENT

CROSS-REFERENCE TO RELATED APPLICATION

This application claims priority to German Patent Application No. 10 2014 109 362.3 filed Jul. 4, 2014, the entire disclosure of which is incorporated by reference herein.

TECHNICAL FIELD

The present disclosure relates to an aircraft structural component having a skin element, having a multitude of transverse stiffening elements and a multitude of longitudinal stiffening elements. The aircraft structural component may be an airplane structural component, such as, for example, a section of fuselage, wing, tail unit or flaps, or alternatively a corresponding structural component of a helicopter or a rocket. Furthermore, the disclosure herein relates to an aircraft having such an aircraft structural component.

BACKGROUND

The skin element includes an inner and an outer surface. The transverse stiffening elements can, for example, be in the form of frames and lie, preferably parallel, spaced apart from each other against the inner surface of the skin element. The longitudinal stiffening elements can, for example, be designed as stringers and lie, preferably parallel, spaced apart from each other and transverse to the transverse stiffening elements against the inner surface of the skin element. The longitudinal stiffening elements can extend approximately parallel to each other, however they can also, as in the case of the tail area of an airplane fuselage for example, run closer towards each other or further apart from each other. The same applies to the transverse stiffening elements, which can also extend approximately parallel to each other or run closer towards each other.

The skin element includes a multitude of skin sections, each of which is defined between two neighboring transverse stiffening elements and two neighboring longitudinal stiffening elements. Thus, between a first and a second transverse stiffening element viewed in the longitudinal direction and also between a first and a second longitudinal stiffening element viewed in the transverse direction, a first skin section is defined.

Such aircraft structural components have long been known about from the prior art and are commonly used in airplane construction, in particular for fuselage construction, where the longitudinal stiffening elements then extend parallel to the longitudinal axis of the airplane, but also for the wings, tail unit or flaps. The longitudinal stiffening elements primarily serve two main purposes. Firstly, they serve to transmit forces in a longitudinal direction of the aircraft structural component, in other words, in the direction of extension of the longitudinal stiffening elements and transverse to the direction of extension of the transverse stiffening elements. Secondly, they serve to support and stabilize the skin element and prevent local occurrence of buckling on the skin element.

At the same time, however, every longitudinal stiffening elements involves its own costs, for example the costs of production and of integration of the longitudinal stiffening element into the aircraft structural component, and plays a part in increasing the weight of the aircraft structural component and thus in increasing the empty weight of the aircraft it is part of, and both of these factors are generally disadvantageous. Accordingly, longitudinal stiffening elements should be used in an aircraft structural component only where they are absolutely essential.

It has been discovered that in numerous aircraft structural components, most of the longitudinal stiffening elements have the minimum diameter, because in their current number, that is to say, with the current spacing between each other, they are needed to prevent local buckling, but are not, however, needed for the transmission of longitudinal forces. In other words, in the case of most of the longitudinal stiffening elements, the criterion which determines the spacing between the longitudinal stiffening elements and thus the quantity of longitudinal stiffening elements, is the prevention of local buckling, and not the transmission of longitudinal forces. Therefore, if it were possible to reduce the influence of the spacing between the longitudinal stiffening elements on the buckling behavior of the skin element, the longitudinal stiffening elements could be employed with significantly greater spacing between each other and therefore in a significantly smaller quantity.

From the patent DE 10 2010 035 787 A1 an airplane structural component is known, the skin element of which is constructed in a sandwich construction with an inner and an outer face sheet and between the face sheets a core layer, which extends along the longitudinal stiffening elements.

SUMMARY

Therefore, an object of the present disclosure is to provide an aircraft structural component, in which the quantity of the longitudinal stiffening elements is reduced and thus the empty weight of the aircraft it is part of as well as the costs for production and installation of the longitudinal stiffening elements are reduced.

This objective is achieved in that in the first skin section on the inner surface of the skin element a first applied reinforcement is mounted. The first applied reinforcement includes a core layer lying against the inner surface of the skin element, having a contour line which, when viewed perpendicular to the inner surface of the skin element, runs along the circumference of the skin element. Furthermore, the first applied reinforcement includes a face sheet surrounding the core layer on the side thereof which faces away from the skin element, which face sheet is connected to the skin element along the contour line of the core layer.

Thus the core layer is enclosed in a sandwich arrangement between the skin element and the face sheet. The face sheet can, however, also extend between core layer and skin element, and thus, on its own, enclose the core. In any case, the core layer is held by the face sheet on the skin element, wherein the face sheet extends beyond the contour line of the core layer and in this area it is fixed to the skin element.

The core layer can, for example, be made of a foam material, of TFC material or of SYNCORE® material. TFC stands for "Tailored Foam Core", and this is a foam material reinforced with structural threads or needles. SYNCORE® is the name for a core material providing greater rigidity made of foamed resin. In particular, the core layer can be understood to be any core system defined as a construct of all elements which, immediately prior to curing, are located between the face sheet and the skin element. These elements can have different materials and compositions, such as for example, foam elements, carbon fiber bundles, carbon fiber fabric, embedded preforms, shaped profiles, tubes, etc. (definition based on: "Zahlen, Pierre: Beitrag zur Kostengünstigen Industriellen Fertigung von Haupttragenden CFK- Grosskomponenten der Kommerziellen Luftfahrt Mittels Kernverbundbauweise in Harzinfusionstechnologie; ISBN 978-3-8325-3329-8; Logos Verlag Berlin GmbH, 2013").

The first applied reinforcement, in particular the core layer, supports the skin element in the first skin section on the inner surface side of the skin element, so that buckling of the skin element in this first skin section is prevented. Because during buckling a load distributed two-dimensionally on the first skin section, but no point load, acts on the first skin section and thus must be absorbed by the first applied reinforcement, it is expedient for the core to be formed by a material which is as light as possible, but which is not necessarily particularly hard or stiff, such as foam, TFC or SYNCORE®, for example.

The skin element, just like the face sheet, can be made of a fiber-reinforced plastic, such as CFRP or GFRP for example, or alternatively of a metal, such as aluminum, for example. The first applied reinforcement is preferably mounted after the production of the skin element onto that skin element. Alternatively, the face sheet or the entire first applied reinforcement may also be produced as an integral part of the skin element.

In this way, it is possible to effectively prevent buckling in the skin sections fitted with an applied reinforcement, so that the spacing between two neighboring longitudinal stiffening elements, for example between the first longitudinal stiffening element and the second longitudinal stiffening element, can be increased, and thus the overall quantity of longitudinal stiffening elements on the aircraft structural component can be reduced. A maximum permissible spacing between two neighboring longitudinal stiffening elements is determined ultimately by the need for adequate transmission of longitudinal forces in the direction of extension of the longitudinal stiffening elements. A reduction of the quantity of longitudinal stiffening elements is a positive development for the aircraft structural component, on the one hand bringing about a reduction of the weight of the aircraft structural component and thus of the structural weight of the aircraft, and on the other hand, a reduction or avoidance of the production and installation costs for the omitted longitudinal stiffening elements.

It is not necessary for every skin section of an aircraft structural component to be fitted with an applied reinforcement. It is rather the case that there may be areas of the aircraft structural component in which an increase in the spacing between the longitudinal stiffening elements by mounting an applied reinforcement is expedient, because in that location the spacing between the longitudinal stiffening elements is determined by the risk of local buckling. At the same time, there may however also be areas of the aircraft structural component, for example the window belt element of an airplane fuselage structural component, in which the spacing between two neighboring longitudinal stiffening elements is principally determined by the longitudinal forces to be transmitted, so that at these locations no applied reinforcements are employed on the skin sections, since this measure could not achieve an increase in the spacing between two longitudinal stiffening elements.

In one preferred embodiment, the first applied reinforcement extends from the first transverse stiffening element to the second transverse stiffening element. Additionally or alternatively, the applied reinforcement extends from the first longitudinal stiffening element to the second longitudinal stiffening element. To protect as large an area of the first skin section as possible from buckling of the skin element, the applied reinforcement extends preferably over as large an area of the first skin section as possible, which is limited only by the shape of the contour line and by adequate fixing of the face sheet to the skin element along the contour line.

The first applied reinforcement can also include two or more core layers spaced apart from each other and lying next to each other or alternatively one core layer having two or more separate core layer components spaced apart and lying next to each other, which can be designed as parallel strips for example.

In another preferred embodiment, the circumferential contour line of the core layer has, when viewed perpendicular to the inner surface of the skin element, a shape which is approximately lenticular, elliptical or circular. With such a core layer shape, buckling of the skin element can be prevented as much as possible, while at the same time minimal core layer material usage is required. A lenticular contour line refers to the cross-sectional shape of a lens which is convex on both sides, and it may, in sections, have the shape of a catenary curve or of a parabola. Alternatively, the contour line can, however, also have any other shape, such as the shape of a rectangle, a trapezoid, an L-piece or a V-piece, for example. The corners of these shapes can be rounded off.

In still another preferred embodiment, viewed in a cross-section perpendicular to the longitudinal stiffening elements, the surface of the core layer has, on the side facing away from the skin element, a lenticular, in particular a semi-lenticular curve. In addition or alternatively, the surface of the core layer, viewed in a cross-section perpendicular to the transverse stiffening elements, on the side facing away from the skin element, has a lenticular, in particular a semi-lenticular curve. A lenticular, in particular a semi-lenticular curve of the surface of the core layer should be understood in the context of the present disclosure to mean the convex curve of the contour of a lens viewed in cross-section on one of the two opposite sides of the lens. In other words, this curve describes constant convex bending. The lenticular, in particular semi-lenticular, curve can in this context have the shape of a catenary curve or a parabola.

With such a shape of the core layer, the skin element in the first skin section can be braced as effectively as possible against buckling, while at the same time minimal core layer material usage is required. In both above-mentioned cross-sections, the surface of the core layer can, however, also have any other shape, such as the shape of a rectangle, a trapezoid, or a circular segment or hybrids thereof, for example.

In accordance with still another preferred embodiment, the face sheet is formed integrally with the first longitudinal stiffening element. Additionally or alternatively, the face sheet is formed integrally with the second longitudinal stiffening element. This simplifies the production of the aircraft structural component, because the longitudinal stiffening elements, together with the face sheet of the first applied reinforcement and, if required, additional applied reinforcements, can be mounted onto the skin layer in one step. At the same time, the stiffness and rigidity of the aircraft structural component in the direction of extension of the transverse stiffening elements is increased with minimal material usage.

In accordance with still another preferred embodiment, a third transverse stiffening element is provided next to the second transverse stiffening element. Between the second and the third transverse stiffening elements and between the first and the second longitudinal stiffening elements, a second skin section is defined. In the second skin section on the inner surface of the skin element, a second applied reinforcement is mounted, which is formed analogously to the first applied reinforcement. Even more applied reinforcements may be mounted on the skin sections adjoining the second skin section, the applied reinforcements being designed the same as the first applied reinforcement.

It is particularly preferable for the face sheet of the first applied reinforcement to be formed integrally with the face sheet of the second applied reinforcement. Such integrally formed face sheets of neighboring applied reinforcements facilitate or accelerate the process of producing the aircraft structural component, because the face sheets of several neighboring applied reinforcements can be mounted in one step and because, thanks to a continuous face sheet, the stiffness and rigidity of the aircraft structural component in the longitudinal direction, in other words, in the direction of extension of the longitudinal stiffening elements, is increased. During production of the aircraft structural component, the integrally formed face sheets can be mounted before the transverse stiffening elements are connected to the skin element, so that the face sheets are arranged between the skin element and the transverse stiffening elements and are additionally fixed in place by them.

In another preferred embodiment, a third longitudinal stiffening element is provided next to the second longitudinal stiffening element. Between the first and the second transverse stiffening elements and between the second and the third longitudinal stiffening elements, a second skin section is defined. In the second skin section on the inner surface of the skin element, a second applied reinforcement is mounted, which is formed analogously to the first applied reinforcement. Following on from the second skin section, additional skin sections can be fitted with applied reinforcements, the applied reinforcements being formed analogously to the first applied reinforcement.

It is particularly preferred that a third transverse stiffening element is provided next to the second transverse stiffening element. Between the second and the third transverse stiffening elements and between the first and the third longitudinal stiffening elements, a third skin section is defined. In the third skin section on the inner surface of the skin section, a third applied reinforcement is mounted, which is formed analogously to the first and second applied reinforcements, but which extends between the first and the third longitudinal stiffening element, in particular from the first as far as to the third longitudinal stiffening element. This creates a transition region between an area of the aircraft structural component in which the skin sections are smaller, in other words, the longitudinal stiffening elements lie closer to each other, and an area in which the skin sections are wider, in other words, in which the longitudinal stiffening elements are spaced further apart from each other. Preferably the spacing between the first and the third longitudinal stiffening elements is double the size of the spacing between the first and second and/or second and third longitudinal stiffening elements. The spacing between two longitudinal stiffening elements or the width of a skin section can thus be doubled or halved by stages from one transverse stiffening element to the next.

It is also particularly preferred that an additional transverse stiffening element is provided next to the first transverse stiffening element and on the side opposite the second transverse stiffening element. Between the additional transverse stiffening element and the first transverse stiffening element and also between and parallel to the first and the second longitudinal stiffening elements, an additional longitudinal stiffening element is provided. Between the additional transverse stiffening element and the first transverse stiffening element and also between the first longitudinal stiffening element and the additional longitudinal stiffening element, a first additional skin section is defined. Between the additional transverse stiffening element and the first transverse stiffening element and also between the additional longitudinal stiffening element and the second longitudinal stiffening element, a second additional skin section is defined. In the first and second additional skin sections on the inner surface of the skin element, however, no applied reinforcements are mounted.

In this way, a transition may be formed on the aircraft structural component between skin sections which are so small, or, in other words, longitudinal stiffening elements which lie so close to each other that no applied reinforcement is required in these skin sections, and skin sections which are so wide, or, in other words, their longitudinal stiffening elements are spaced so far apart from each other, that applied reinforcements need to be mounted on these skin sections to prevent buckling of the skin element. Preferably, a transition from skin sections without applied reinforcements to skin sections of large width and having a wide applied reinforcement is created across several transverse stiffening elements on the aircraft structural component.

BRIEF DESCRIPTION OF THE DRAWINGS

Exemplary embodiments of the present disclosure are explained in greater detail below by reference to drawings. The drawings show in.

DETAILED DESCRIPTION

Figure 1:
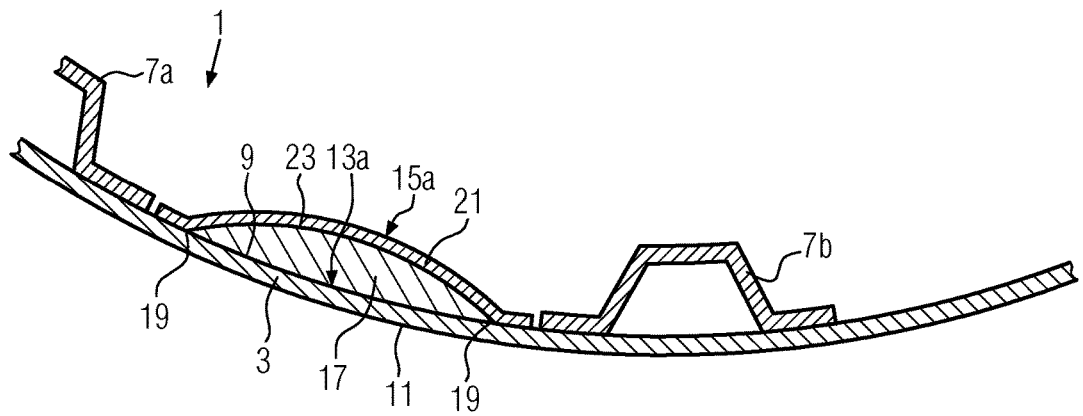
FIG. 1 a cross-sectional view of a first exemplary embodiment of an aircraft structural component according to the disclosure herein transverse to the direction of extension of the longitudinal stiffening elements.
Figure 2:
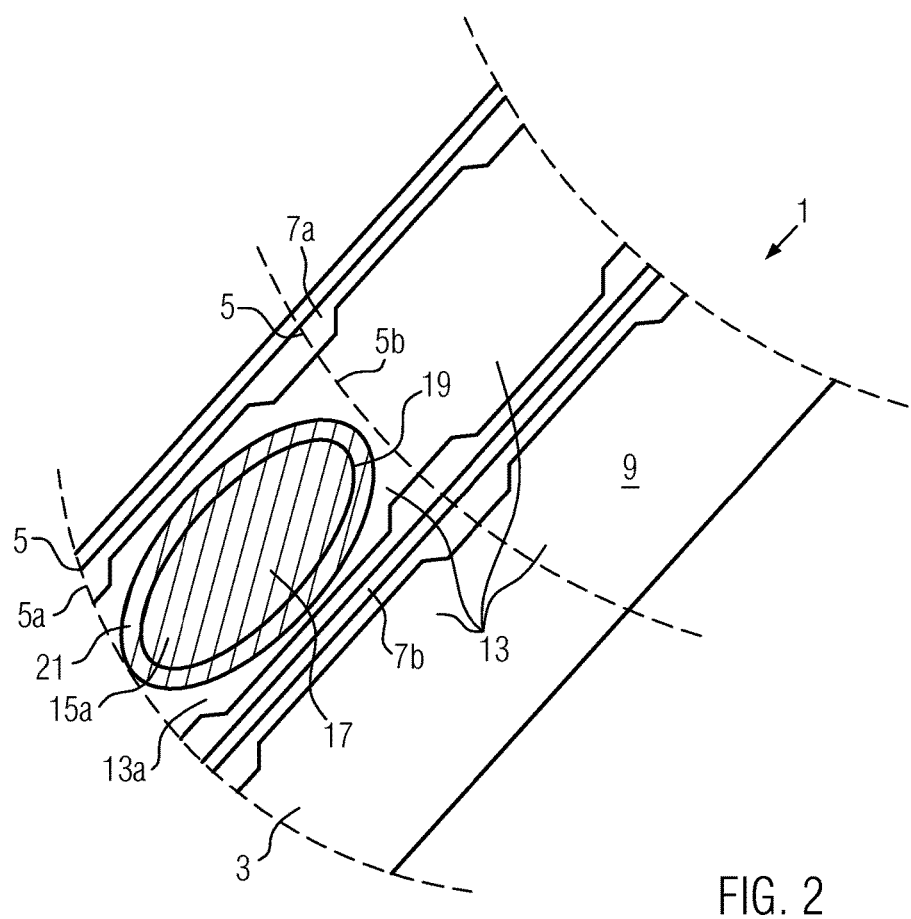
FIG. 2 a top view of the inner surface of the aircraft structural component of FIG. 1.

FIGS. 1 and 2 depict an exemplary embodiment of an aircraft structural component 1 according to the disclosure herein, which, in the case depicted, is a fuselage structural segment of an airplane. The aircraft structural component 1 comprises a skin element 3, a multitude of transverse stiffening elements 5, and a multitude of longitudinal stiffening elements 7.

The skin element 3 includes an inner surface 9 and an outer surface 11. In the case depicted, the transverse stiffening elements 5 are frames and extend parallel spaced apart from each other lying against the inner surface 9 of the skin element 3. In the case depicted, the longitudinal stiffening elements 7 are stringers and extend parallel spaced apart from each other and transverse to the transverse stiffening elements 5 lying against the inner surface 9 of the skin element 3. The skin element 3 includes a multitude of skin sections 13, each of which is defined between two neighboring transverse stiffening elements 5 and two neighboring longitudinal stiffening elements 7.

As depicted in FIGS. 1 and 2, between a first and a second transverse stiffening element 5a, 5b and also between a first and a second longitudinal stiffening element 7a, 7b, a first skin section 13a is defined (the transverse stiffening elements 5 are shown merely outlined in FIG. 2). In this first skin section 13a on the inner surface 9 of the skin element 3, a first applied reinforcement 15a is mounted. The first applied reinforcement 15a includes, lying against the inner surface 9 of the skin element 3, a core layer 17, which in the case depicted is made of foam, but which can also be made of TFC material or SYNCORE® material. The core layer 17, when viewed perpendicular to the inner surface 9 of the skin element 3, has a circumferential contour line 19, which delimits the area with which the core layer 17 lies against the skin element 3. Furthermore, the first applied reinforcement 15a includes a face sheet 21 surrounding the core layer 17 on the side thereof which faces away from the skin element 3. The face sheet 21 is connected to the skin element 3 along the contour line 19 of the core layer 17, in other words, it is fixed to this skin element 3, so that the core layer 17 is enclosed in a sandwich arrangement between the skin element 3 and the face sheet 21.

The first applied reinforcement 15a extends from the first transverse stiffening element 5a to the second transverse stiffening element 5b and from the first longitudinal stiffening element 7a to the second longitudinal stiffening element 7b. As can be seen in FIG. 2 in particular, the circumferential contour line 19 of the core layer 17, when viewed perpendicular to the inner surface 9 of the skin element 3, has a shape which is approximately lenticular. The surface 23 of the core layer 17 on the side facing away from the skin element 3, viewed in a cross-section perpendicular to the longitudinal stiffening elements 7 (see FIG. 1) and viewed in a cross-section perpendicular to the transverse stiffening elements 5, has a lenticular, in particular, a semi-lenticular curve.

Figure 3:
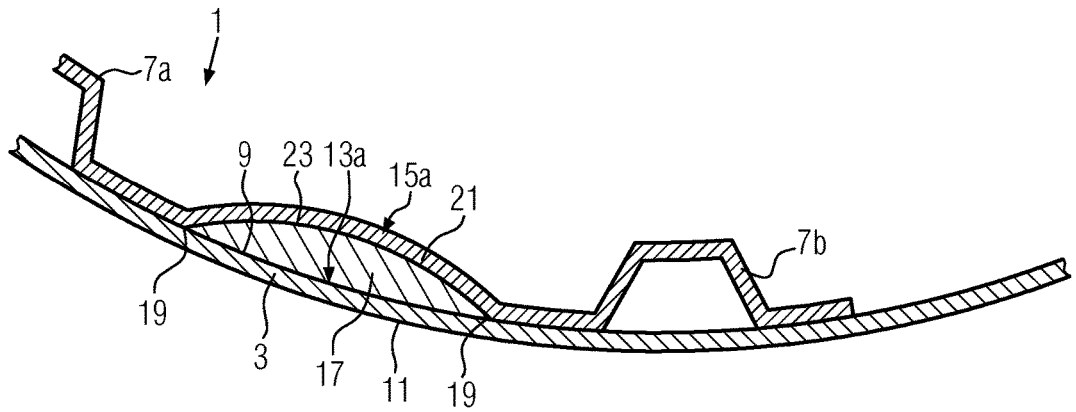
FIG. 3 a cross-sectional view of a second exemplary embodiment of an aircraft structural component transverse to the direction of extension of the longitudinal stiffening elements, which differs from the exemplary embodiment of FIG. 1 in that the face sheet of the first applied reinforcement is formed as an integral part of the longitudinal stiffening elements.
Figure 6:
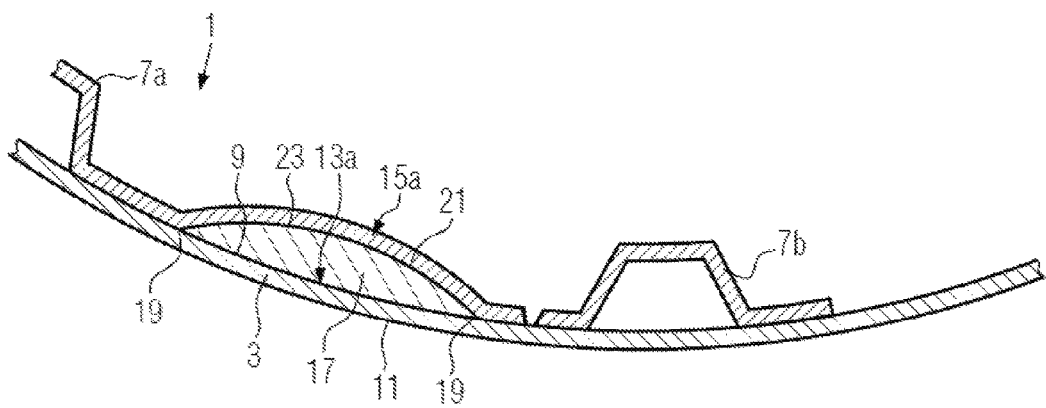
FIG. 6 a cross-sectional view of a fifth exemplary embodiment of an aircraft structural component transverse to the direction of extension of the longitudinal stiffening elements, which differs from the exemplary embodiment of FIG. 1 in that the face sheet of the first applied reinforcement is formed as an integral part of the first longitudinal stiffening element FIG. 7 a cross-sectional view of a sixth exemplary embodiment of an aircraft structural component transverse to the direction of extension of the longitudinal stiffening elements, which differs from the exemplary embodiment of FIG. 1 in that the face sheet of the first applied reinforcement is formed as an integral part of the second longitudinal stiffening element.
Figure 7:
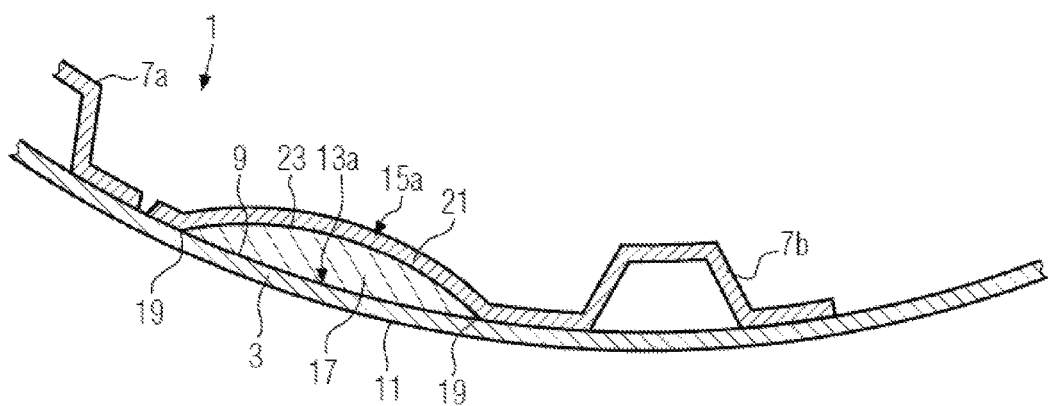

In the exemplary embodiment depicted in FIG. 3, the aircraft structural component 1 shown in FIGS. 1 and 2 is modified in that the face sheet 21 of the first applied reinforcement 15a is formed as an integral part of the first longitudinal stiffening element 7a and of the second longitudinal stiffening element 7b. The face sheet 21 can also be formed as an integral part of other longitudinal stiffening elements 7. Additionally, face sheet 21 can be formed integrally with either one of or both of the first longitudinal stiffening element 7a and the second longitudinal stiffening element 7b, as shown in FIGS. 6 and 7, respectively.

Figure 4:
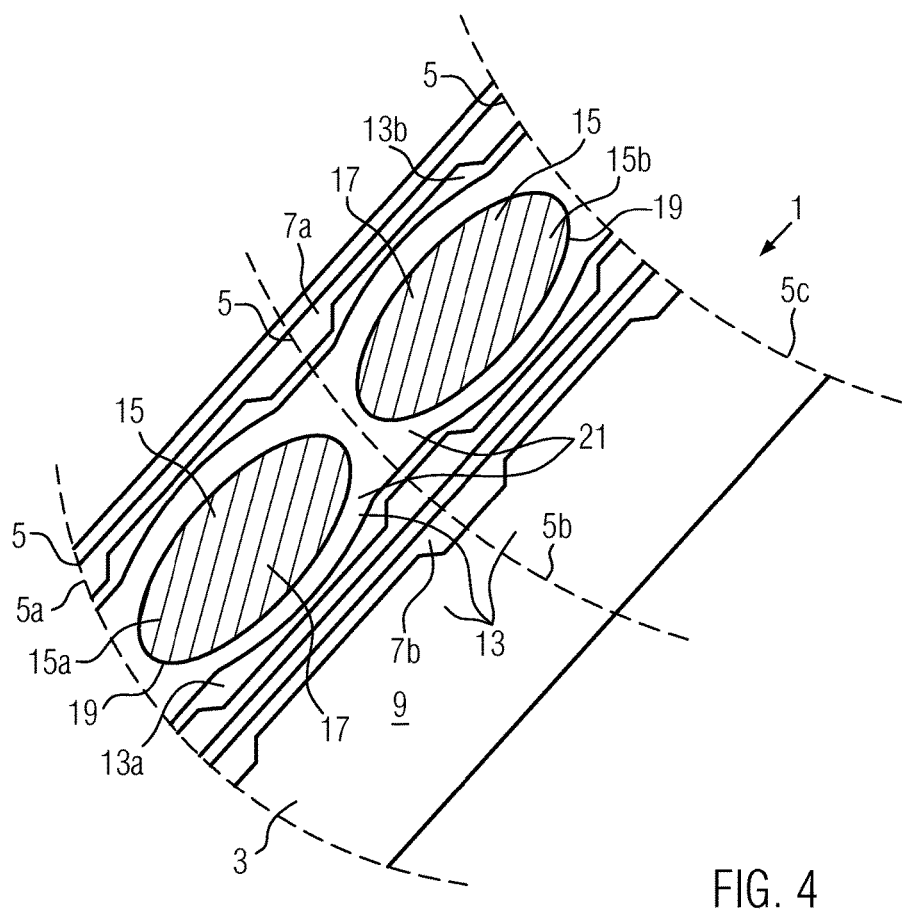
FIG. 4 a top view of the inner surface of the skin element of a third exemplary embodiment of an aircraft structural component, which differs from the exemplary embodiment shown in FIG. 2 in that the face sheet of two neighboring applied reinforcements is integrally formed.

In the exemplary embodiment shown in FIG. 4, the aircraft structural component 1 described in FIGS. 1 and 2 is modified in such a way that next to the second transverse stiffening element 5b, a third transverse stiffening element 5c is provided (the transverse stiffening elements 5 are shown merely outlined in FIG. 4), wherein between the second and the third transverse stiffening elements 5b, 5c and also between the first and the second longitudinal stiffening elements 7a, 7b, a second skin section 13b is defined, in which on the inner surface 9 of the skin element 3 a second applied reinforcement 15b is mounted, which is formed analogously to the first applied reinforcement 15a. The face sheet 21 of the first applied reinforcement 15a is formed as an integral part of the face sheet 21 of the second applied reinforcement 15b. For this purpose, in the present exemplary embodiment, the continuous face sheets 21 of the first and second applied reinforcements 15a, 15b are arranged below the second transverse stiffening element 5b, in other words, between the second transverse stiffening element 5b and the skin element 3, wherein the second transverse stiffening element 5b is shown only in the form of dashed lines in FIGS. 2 and 4.

Figure 5:
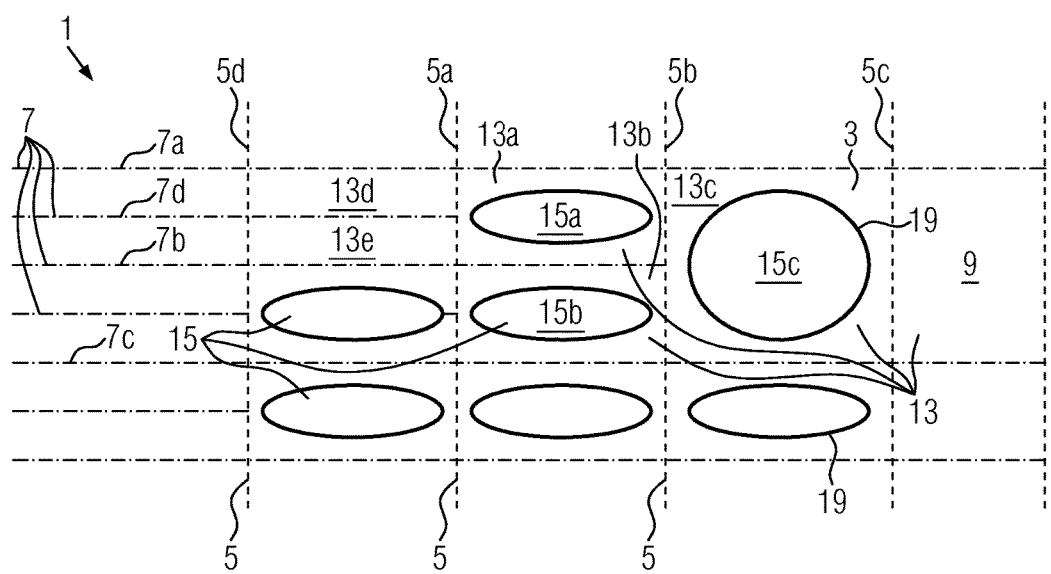
FIG. 5 a schematic representation of a fourth exemplary embodiment of an aircraft structural component, wherein an incremental transition from small skin sections without applied reinforcements to skin sections of large width and having a wide applied reinforcement is provided.

In the embodiment depicted in FIG. 5, the aircraft structural component 1, depicted here in outline, differs from the aircraft structural component 1 depicted in FIGS. 1 and 2 in that next to the second longitudinal stiffening element 7b, a third longitudinal stiffening element 7c is provided, wherein between the first and the second transverse stiffening elements 5a, 5b and also between the second and the third longitudinal stiffening elements 7b, 7c, a second skin section 13b is defined, in which on the inner surface 9 of the skin element 3 a second applied reinforcement 15b is mounted, which is formed analogously to the first applied reinforcement 15a. Furthermore, next to the second transverse stiffening element 5b a third transverse stiffening element 5c is provided, wherein between the second and the third transverse stiffening elements 5b, 5c and also between the first and the third longitudinal stiffening elements 7a, 7c, a third skin section 13c is defined, in which on the inner surface 9 of the skin element 3 a third applied reinforcement 15c is mounted, which is formed analogously to the first and second applied reinforcements 15a, 15b. This third applied reinforcement 15c, however, extends between the first and the third longitudinal stiffening element 7a, 7c, in other words, it is as wide as the first and second applied reinforcements 15a, 15b combined.

Next to the first transverse stiffening element 5a on the side opposite the second transverse stiffening element 5b, an additional transverse stiffening element 5d is provided in this embodiment. Between the additional transverse stiffening element 5d and the first transverse stiffening element 5a and also between and parallel to the first and second longitudinal stiffening elements 7a, 7b, an additional longitudinal stiffening element 7d is provided. Thus, between the additional transverse stiffening element 5d and the first transverse stiffening element 5a and also between the first longitudinal stiffening element 7a and the additional longitudinal stiffening element 7d, a first additional skin section 13d is defined. At the same time, between the additional transverse stiffening element 5d and the first transverse stiffening element 5a and also between the additional longitudinal stiffening element 7d and the second longitudinal stiffening element 7b, a second additional skin section 13e is defined. However, unlike the first, second and third skin sections 13a, 13b, 13c, the first and second additional skin sections 13d, 13e do not have any applied reinforcement 15 mounted on the inner surface 9 of the skin element 3.

Next to the first, second and third skin sections 13a, 13b, 13c, and next to the first and second additional skin sections 13d, 13e, numerous skin sections 13 are provided, which are formed analogously to the aforementioned first to third and first and second additional skin sections 13a, 13b, 13c, 13d, 13e. In this way, a transition from an area with closely-arranged longitudinal stiffening elements 7 without applied reinforcements 15 to an area with longitudinal stiffening elements 7 spaced further apart from each other and additionally having an applied reinforcement 15 is implemented on the aircraft structural component 1.

With an aircraft structural component 1 according to any one of the first to fourth exemplary embodiments, the applied reinforcements 15 ensure that buckling of the skin element 3 is prevented in the corresponding skin sections 13, so that the longitudinal stiffening elements 7, which delimit a skin section 13 fitted with an applied reinforcement 15, can be spaced further apart from each other. Consequently, it is possible to use fewer longitudinal stiffening elements 7 overall in the aircraft structural component 1, which, in turn, permits weight and cost savings.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft structural component, comprising:
a skin element, which includes an inner surface and an outer surface;
a multitude of transverse stiffening elements, which lie spaced apart from each other against the inner surface of the skin element; and
a multitude of longitudinal stiffening elements, which lie spaced apart from each other and transverse to the transverse stiffening elements against the inner surface of the skin element;
wherein the skin element includes a multitude of skin sections, each of which is defined between two neighboring transverse stiffening elements and two neighboring longitudinal stiffening elements,
wherein between a first and a second transverse stiffening element and between a first and a second longitudinal stiffening element, a first skin section is defined,
wherein, in the first skin section on the inner surface of the skin element a first applied reinforcement is mounted,
wherein the first applied reinforcement includes a core layer lying against the inner surface of the skin element and having a circumferential contour line on the inner surface of the skin element,
wherein the first applied reinforcement includes a face sheet surrounding the core layer on a side of the core layer which faces away from the skin element, which face sheet is directly attached to the skin element along the circumferential contour line of the core layer, such that the core layer is entirely enclosed between the face sheet and the inner surface of the skin element,
wherein the face sheet is formed integrally with either one of or both of the first longitudinal stiffening element and the second longitudinal stiffening element, and
wherein the circumferential contour line of the core layer has a shape which is lenticular, elliptical or circular when viewed perpendicular to the inner surface.

2. The aircraft structural component according to claim 1, wherein the first applied reinforcement extends from the first transverse stiffening element to the second transverse stiffening element or from the first longitudinal stiffening element to the second longitudinal stiffening element.

3. The aircraft structural component according to claim 1, wherein when viewed in a cross-section perpendicular to the longitudinal stiffening elements, a surface of the core layer has, on the side facing away from the skin element, a lenticular curve.

4. The aircraft structural component according to claim 1, wherein a third transverse stiffening element is provided next to the second transverse stiffening element,
wherein between the second and the third transverse stiffening elements and also between the first and the second longitudinal stiffening elements, a second skin section is defined,
wherein in the second skin section on the inner surface of the skin element, a second applied reinforcement is mounted.

5. The aircraft structural component according to claim 4, wherein the face sheet of the first applied reinforcement is formed integrally with a face sheet of the second applied reinforcement.

6. The aircraft structural component according to claim 1, wherein a third longitudinal stiffening element is provided next to the second longitudinal stiffening element,
wherein between the first and the second transverse stiffening elements and the second and the third longitudinal stiffening elements, a second skin section is defined,
wherein in the second skin section on the inner surface of the skin element, a second applied reinforcement is mounted.

7. The aircraft structural component according to claim 6, wherein a third transverse stiffening element is provided next to the second transverse stiffening element,
wherein between the second and the third transverse stiffening element and the first and the third longitudinal stiffening element, a third skin section is defined,
wherein in the third skin section on the inner surface of the skin element, a third applied reinforcement is mounted, which extends from the first to the third longitudinal stiffening element.

8. The aircraft structural component according to claim 6, wherein an additional transverse stiffening element is provided next to the first transverse stiffening element on a side of the first transverse stiffening element opposite the second transverse stiffening element,
wherein between the additional transverse stiffening element and the first transverse stiffening element and also between the first and the second longitudinal stiffening elements, an additional longitudinal stiffening element is provided,
wherein between the additional transverse stiffening element and the first transverse stiffening element and also between the first longitudinal stiffening element and the additional longitudinal stiffening element, a first additional skin section is defined, wherein between the additional transverse stiffening element and the first transverse stiffening element and also between the additional longitudinal stiffening element and the second longitudinal stiffening element, a second additional skin section is defined, and wherein in the first and second additional skin sections on the inner surface of the skin element, no applied reinforcement is mounted.

9. The aircraft structural component according to claim 1, wherein the circumferential contour line of the core layer has, on a side facing away from the inner surface, a shape which is semi-lenticular when viewed in cross section perpendicular to both the longitudinal and the transverse stiffening elements.

* * * * *